United States Patent
Ashby

(10) Patent No.: US 12,190,013 B2
(45) Date of Patent: Jan. 7, 2025

(54) MULTITRACK CONTAINER FOR SOUND EFFECT RENDERING

(71) Applicant: Sony Interactive Entertainment LLC, San Mateo, CA (US)

(72) Inventor: Simon Ashby, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 328 days.

(21) Appl. No.: 16/924,868

(22) Filed: Jul. 9, 2020

(65) Prior Publication Data

US 2022/0012007 A1    Jan. 13, 2022

(51) Int. Cl.
*G06F 17/00* (2019.01)
*A63F 13/54* (2014.01)
*G06F 3/16* (2006.01)
*G06F 8/30* (2018.01)

(52) U.S. Cl.
CPC .............. *G06F 3/165* (2013.01); *A63F 13/54* (2014.09); *G06F 8/30* (2013.01)

(58) Field of Classification Search
CPC ............. G06F 3/165; G06F 8/30; A63F 13/54
USPC ......................................................... 700/94
See application file for complete search history.

(56) References Cited

U.S. PATENT DOCUMENTS

| | | |
|---|---|---|
| 8,013,550 B1 | 9/2011 | Young et al. |
| 2001/0055398 A1 | 12/2001 | Pachet et al. |
| 2003/0045956 A1 | 3/2003 | Comair et al. |
| 2007/0157173 A1* | 7/2007 | Klein .................... G06F 8/71 717/110 |
| 2010/0197401 A1* | 8/2010 | Altshuler ............... A63F 13/54 463/35 |
| 2014/0037111 A1 | 2/2014 | Uhle et al. |
| 2014/0119581 A1 | 5/2014 | Tsingos et al. |
| 2014/0301573 A1* | 10/2014 | Kiely ................. G11B 27/031 381/119 |
| 2014/0334630 A1* | 11/2014 | Harel .................... G10H 1/368 381/61 |
| 2021/0375257 A1* | 12/2021 | Tajik ..................... G10L 25/57 |

FOREIGN PATENT DOCUMENTS

| | | |
|---|---|---|
| JP | 2000342846 A | 12/2000 |
| JP | 2015012592 B | 9/2017 |
| WO | 2015002238 A1 | 1/2015 |

OTHER PUBLICATIONS

Protools Reference Guide (Year: 2019).*
Protools for Game Audio (downloaded from Archive.org and as available 2018) (Year: 2018).*
Wavosaur user manual (Year: 2008).*
Wwise: The Wwise Project Adventure Handbook (Year: 2014).*
Wwise: Wwise blog entry dated Apr. 2, 2019 (Year: 2019).*

(Continued)

*Primary Examiner* — Paul C McCord
(74) *Attorney, Agent, or Firm* — John L. Rogitz; John M. Rogitz

(57) ABSTRACT

Computer game sound effects (SFX) are provided to customers in a container that includes not only the audio file (such as a .wav file) of the SFX but also the information underlying the SFX, so that the customer can alter the SFX at run time or offline without having to purchase a new sound or go back to the sound provider to ask them to make the desired changes.

7 Claims, 9 Drawing Sheets

(56) References Cited

OTHER PUBLICATIONS

Wwise: Wwise Fundamentals (Year: 2012).*
Kastbauer et al., "The Wwise Project Adventure—A Handbook for Creating Interactive Audio Using Wwise", Jan. 1, 2014, retrieved from https://www.audiokinetic.com/download/documents/WwiseProjectAdventure_en.pdf.
"International Search Report and Written Opinion" dated Nov. 17, 2021, from the counterpart PCT application PCT/US21/40508.
Buch. "Export a multilrack session from Audition." Adobe. Apr. 28, 2017 (Apr. 28, 2017) Retrieved from entire document.
The Sound Engineering Magazine. "Featuring 2 to 8 trk—The Smaller Recording Studio Guides: Tape & Tape Recorders; Consoles & Mixers." (1986). Nov. 1986 (Nov. 1986) Retrieved on Oct. 10, 2021 (Oct. 10, 2021) from entire document.
Agusta A109:, Pole Position Production, retrieved from https://pole.se/product/agusta-a109/.
Machine translation of JP2000-342846.
Machine translation of JP2015-012592.

* cited by examiner

ONE FILE

MULTIPLE VARIATIONS

MULTITRACK CONTAINER FOR SOUND EFFECT RENDERING

FIELD

The application relates generally to sound effect ("SX") rendering in computer simulations and other applications.

BACKGROUND

Sound effects (SFX) are widely used in computer simulations such as computer games to provide realistic audio. SFX are not dialogue and in some cases are not music either, but rather are artificially created sounds used to emphasize or enhance the content of the game. "Artificially created" includes SFX created using a synthesizer and other apparatus as well as recorded material created in an "organic" fashion, e.g., sound from nature, from Foley sessions, etc. In specific instances SFX may include only artificially created sounds and may exclude music.

Typically, game designers purchase sound effects they desire to use from a supplier and then use the SFX as appropriate in their games. SFX also can be used in any product or experience that contains interactive elements including, in addition to computer simulations, location-based entertainment, interactive films, augmented reality (AR)/virtual reality (VR) and other extended reality (XR) experiences, and applications in the industrial sector including the automotive sector.

SUMMARY

As understood herein, game designers and other designers of applications with SFX cannot modify the inner workings of SFX they purchase without either purchasing an entirely new SFX or asking the supplier to modify the SFX in a way desired by the game designer. Accordingly, present principles provide to customers such as game designers a "multitrack container" as a digital audio workstation (DAW) session setting out the various tracks required to make that sound plus other information underlying the sound. In other words, the multitrack container contains the "recipe" for each sound.

In this way, a customer can modify a SFX without having to purchase a new sound or go back to the sound supplier to ask them to make the desired changes, which may entail considerable back and forth. Instead, the game designers can exercise greater flexibility in managing changes to the sounds themselves. Thus, by providing not only the audio file (such as a .wav file) of the SFX but also all of the underlying information through a DAW, as a single product, game designers are accorded greater flexibility in game development.

Note that in addition, the multitrack containers can be imported into a SFX authoring tool/rendering engine such as Wave Works Interactive Sound Engine (Wwise) from Audiokinetic that also may be provided to the game designer for a complete solution, allowing game designers to modify the SFX "in context".

Accordingly, in one aspect a device includes at least one processor programmed with instructions to access at least a first sound effect (SFX) WAV file having at least first and second tracks and provided by a supplier of SFX. The instructions are executable to bundle the first SFX file with track modification information pertaining to the first and second tracks to establish a multitrack container. The track modification information is useful to modify the SFX file.

The instructions are executable to transmit the multitrack container to at least one computer of at least a first developer of computer applications to enable the first developer to alter the first SFX file in a first way for rendering in a first computer application developed by the first developer.

In some embodiments, the instructions are executable to transmit the multitrack container to at least a second developer of computer applications to enable the second developer to alter the first SFX file in a second way different from the first way.

In non-limiting examples the processor is implemented in a computer of the supplier of SFX.

If desired, the computer of the first developer can be programmed with instructions to render the first SFX in the first computer application. The computer of the first developer can be programmed with instructions to modify the first SFX using the track modification information at run time of the first computer simulation, and/or modify the first SFX using the track modification information offline from run time of the first computer simulation. Note that when provided for offline modification, (which may be considered to be a production phase), everything is delivered and authored at the highest resolution possible, typically in pulse-code modulation format (.wav), whereas delivery for the runtime phase, in which memory may be a limited resource at runtime, most SFX may be compressed using one of the CODEC supported by the sound engine or the platform's OS, such as, for example, Vorbis, Opus, ADPCM, ATRAC9 (a PlayStation specific CODEC), XMA (an Xbox specific CODEC), and AAC (Apple specific).

The instructions can be executable to transmit to the computer of the first developer a SFX rendering engine. The SFX rendering engine may include a SFX authoring tool.

In example implementations, the track modification information can include, for the first and second tracks, respective first and second track modification information such that the first developer can modify the first track separately from the second track. For example, the first track modification information can include one or more of delay, volume, attenuation, compression, distortion, reverberation, panning, filter, time stretch, pitch shift. The SFX file can include three or more tracks.

In another aspect, a method includes establishing a multitrack container with a first multitrack sound effect (SFX) file and information, for at least some of plural tracks in the first multitrack SFX file, track modification information useful for modifying the respective track. The method includes providing the multitrack container to at least a first developer of a first computer application to allow the first developer to modify the first multitrack SFX file using the track modification information in a first way for rendering in the first computer application.

In another aspect, a game developer computer includes at least one processor configured with instructions executable to receive at least a first data structure that includes at least a first sound effect (SFX) file having at least first and second tracks from a supplier of SFX along with track modification information pertaining to the first and second tracks. The instructions are executable to alter the first SFX file using the track modification information and render the SFX file in a first computer application developed by the first developer.

The details of the present application, both as to its structure and operation, can best be understood in reference to the accompanying drawings, in which like reference numerals refer to like parts, and in which:

DETAILED DESCRIPTION

Figure 1:
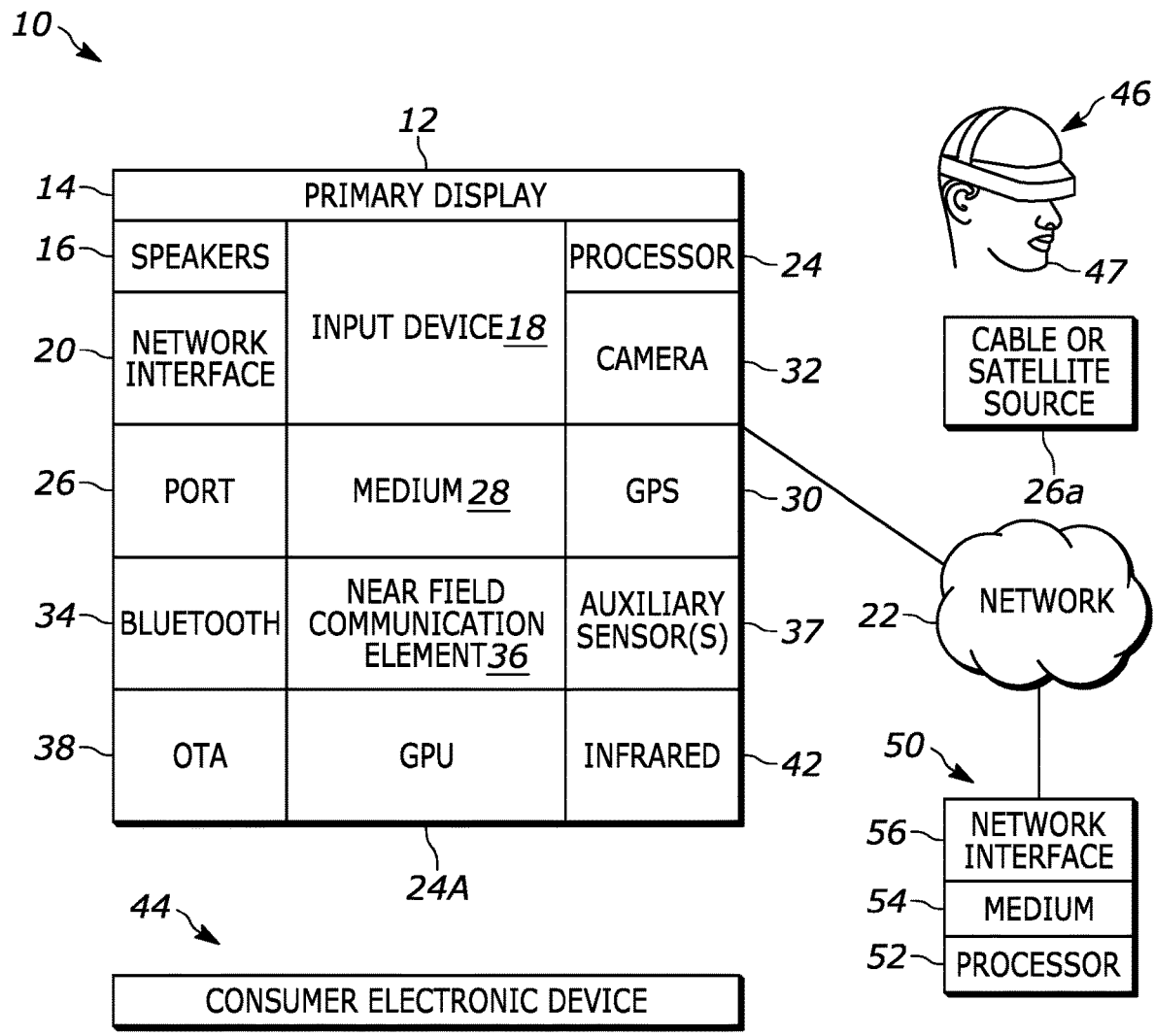
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or, the source 26a may be a game console or disk player containing content. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be a computer game console that can be used to send computer game audio and video to the AVD 12 via commands sent directly to the AVD 12 and/or through the below-described server while a second CE device 46 may include similar components as the first CE device 44. In the example shown, the second CE device 46 may be configured as a computer game controller manipulated by a player or a head-mounted display (HMD) worn by a player 47. In the example shown, only two CE devices 44, 46 are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm", and may include and perform "cloud" functions such that the devices of the system 10 may access a "cloud" environment via the server 50 in example embodiments for, e.g., network gaming applications. Or, the server 50 may be implemented by one or more game consoles or other computers in the same room as the other devices shown in FIG. 1 or nearby.

Figure 2:
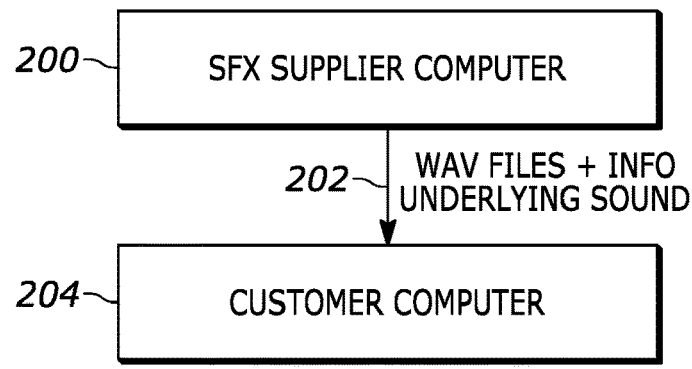
FIG. 2 is a block diagram of an example computer sound effect provisioning system.

FIG. 2 illustrates that a sound effects (SFX) supplier computer 200 may supply SFX multitrack containers 202 to a customer computer 204, such as a computer system of a game developer, typically over wired and/or wireless paths of a wide area computer network such as the Internet.

A multitrack container 202 includes both a multitrack (two and typically more than two tracks) SFX audio file in, e.g., WAV format or MP3 format, and track modification information pertaining to the tracks. As discussed further below, the track modification information is useful to modify the SFX file. That is, a game developer operating the customer computer 204 can, using the track modification information, alter the SFX file for rendering in a computer application such as a computer simulation such as a computer game developed by the first developer. Likewise, a different developer can receive the same multitrack container 202 and use the track modification information to alter same SFX file in a different way for a different computer game. As discussed further below, the track modification information can be used to alter the SFX file at run time of the computer game or offline from run time.

Figure 3:
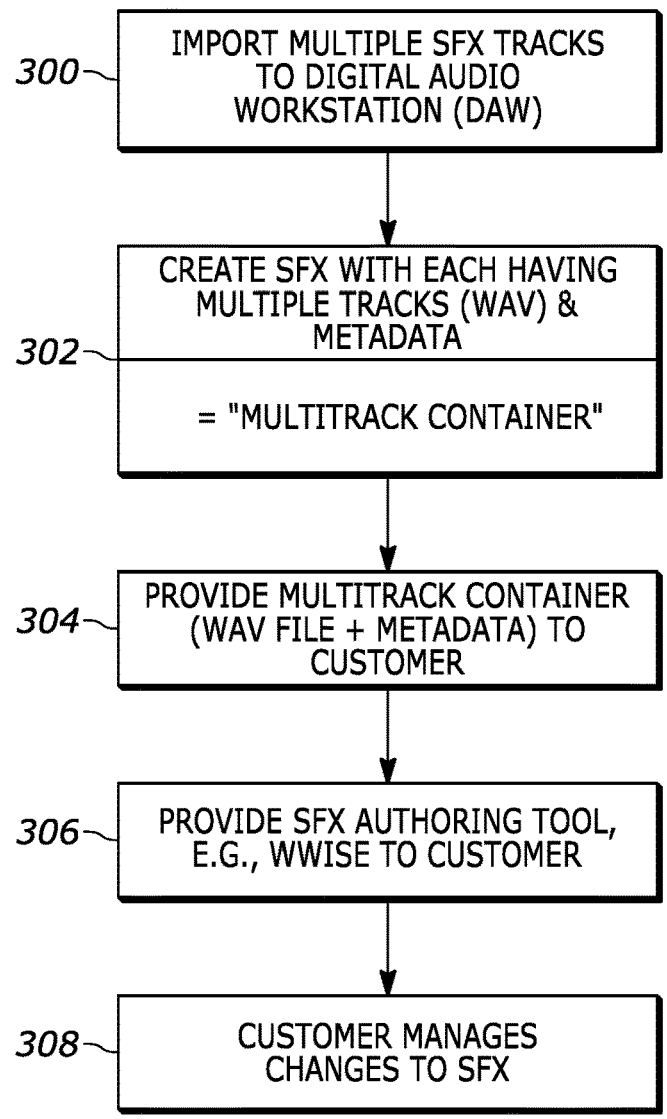
FIG. 3 illustrates example overall logic consistent with present principles in example flow chart format.

FIG. 3 illustrates example overall logic summarized above. Commencing at block 300, SFX tracks can be imported into a digital audio workstation (DAW) such as may be part of the supplier computer 200 shown in FIG. 2. Moving to block 302, using the DAW, SFX files are created with each having plural audio tracks. Track modification information, which may be referred to herein as "metadata", is associated with respective SFX files to produce a multitrack container.

Moving to block 304, the multitrack containers are provided to customers, who may modify the SFX files within the containers using the accompanying track modification information. If desired, an SFX rendering engine may also be provided to the customer computers at block 306. The rendering engine may include an authoring tool. An example of such an engine is Wave Works Interactive Sound Engine (Wwise) from Audiokinetic. Using the authoring tool executed on the customer computer 200, at block 308 the customer game developer makes and manages changes to the SFX files as desired using the respective track modification information accompanying the SFX files.

Figure 4:
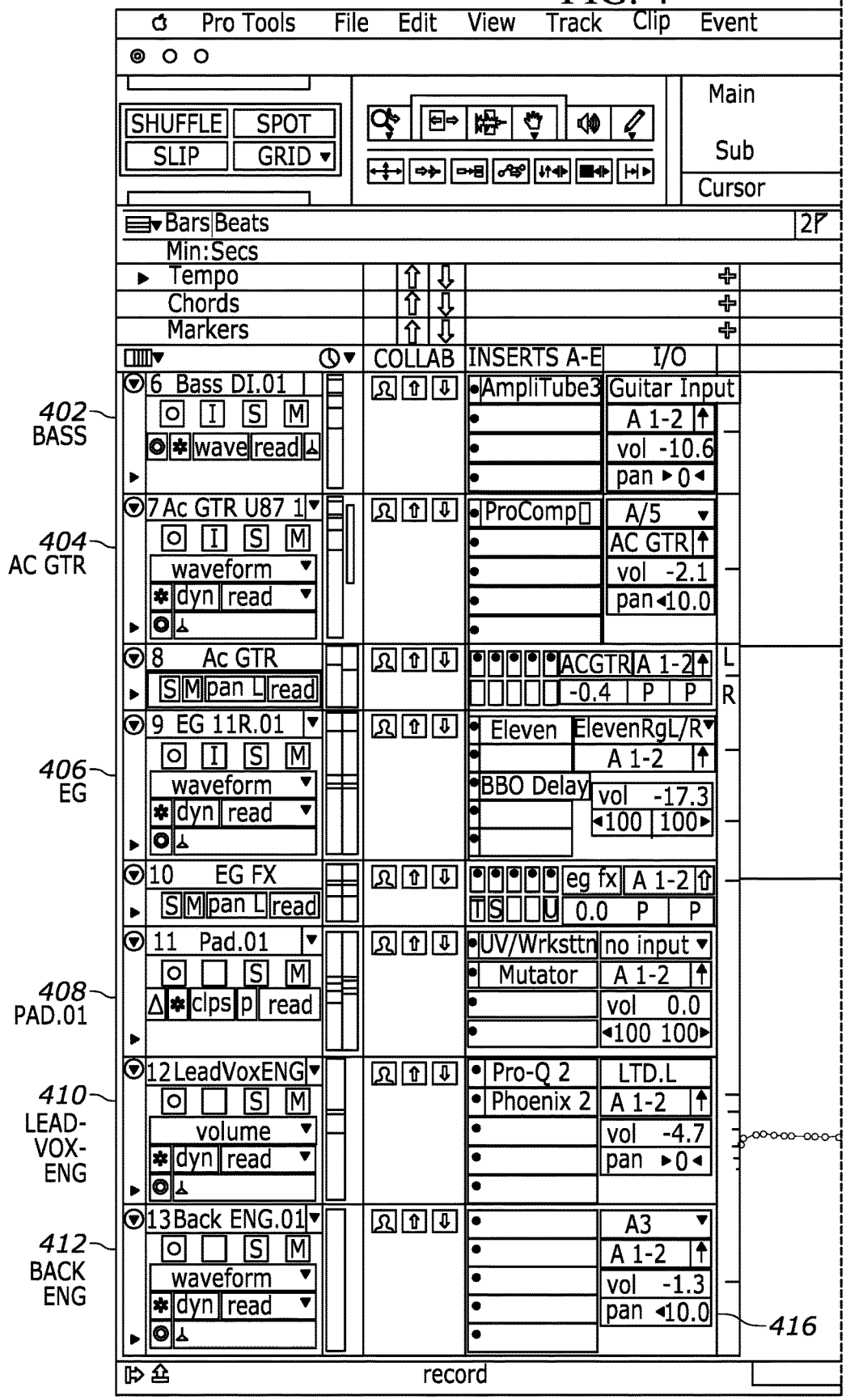
FIGS. 4-6 are screen shots illustrating SFX user interfaces (UI)
Figure 4:
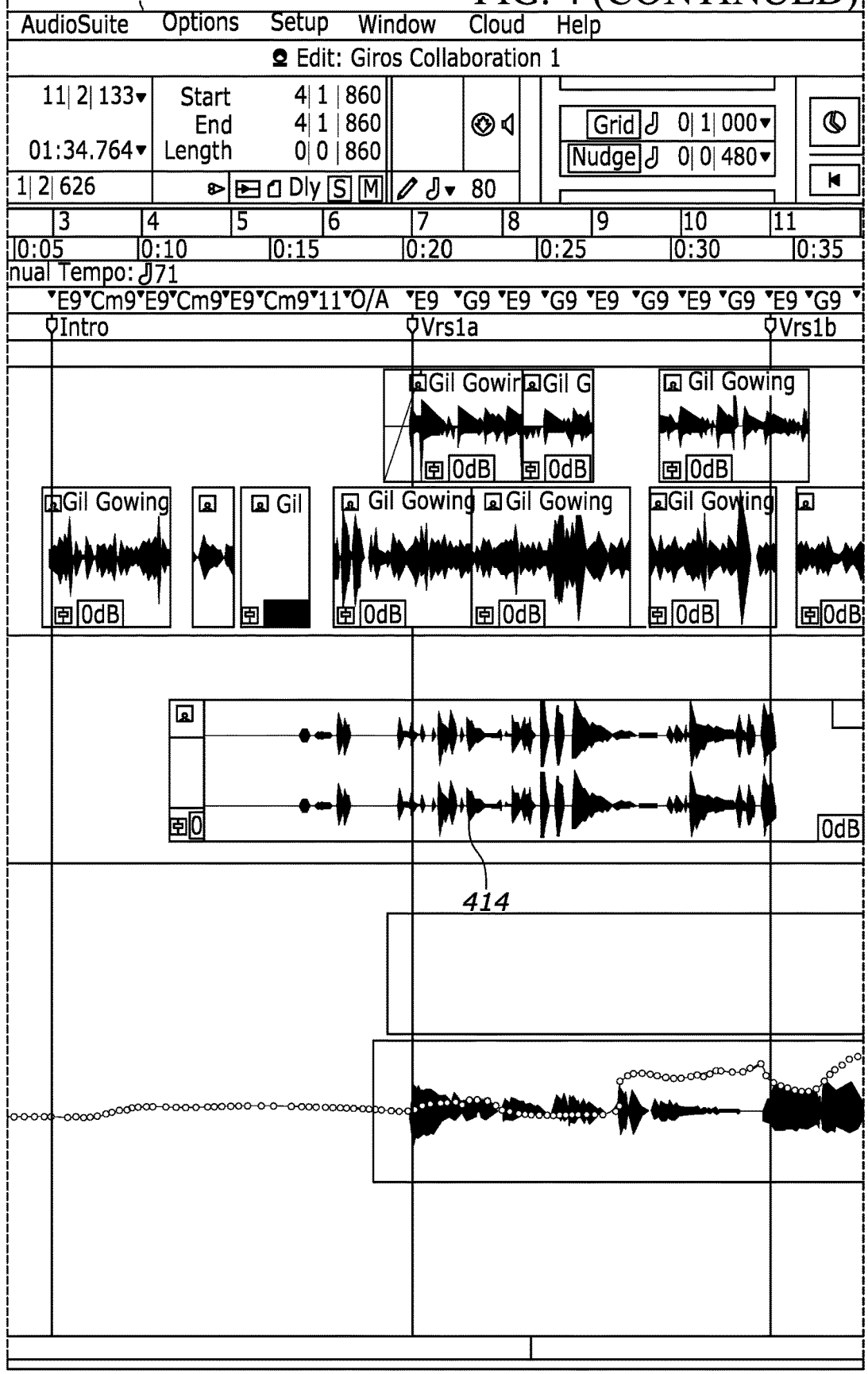
Figure 4:
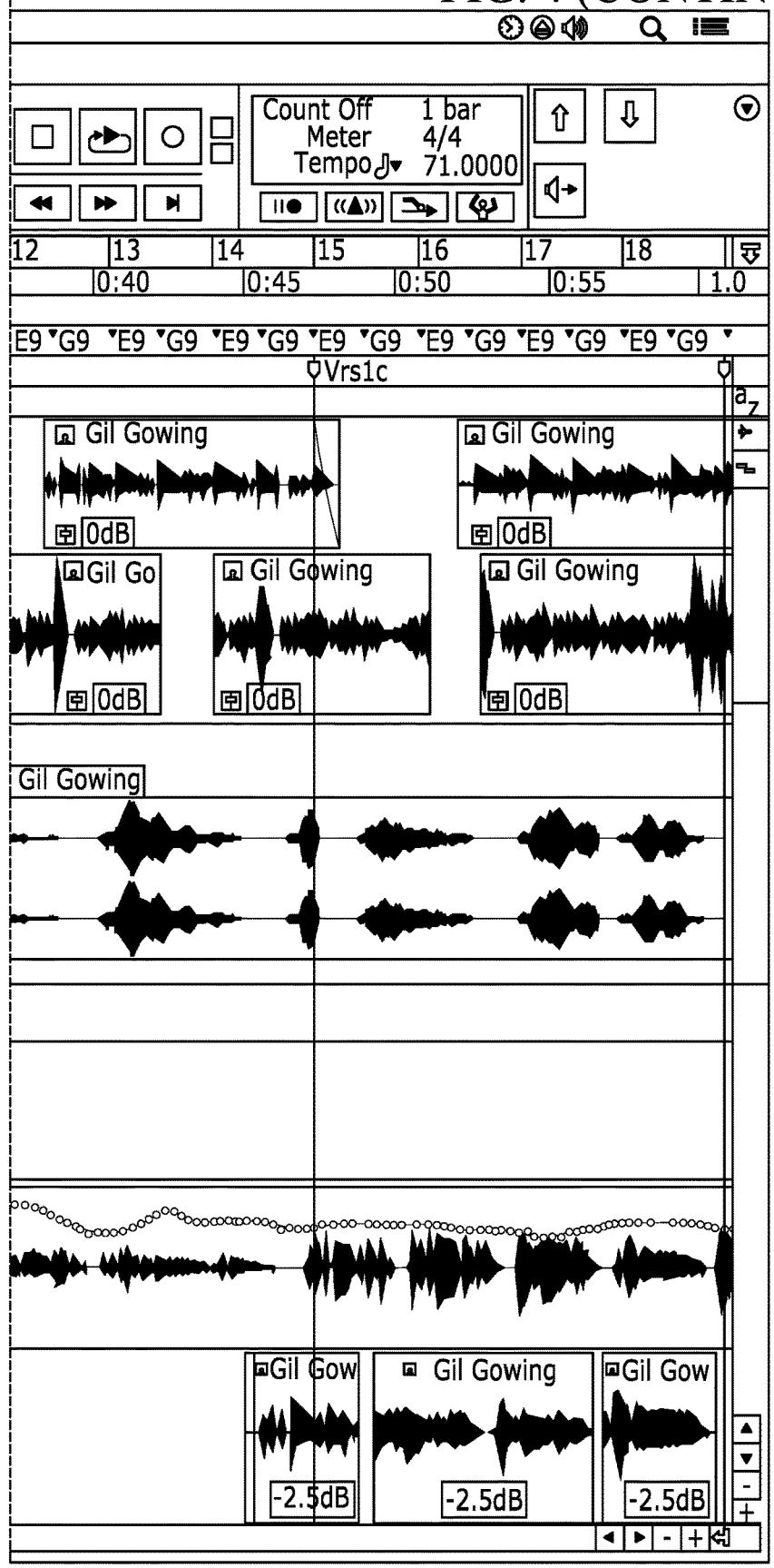

Turn now to FIG. 4, which illustrates a screen shot that may be provided on a display 400 such as any display described herein. The screen shot illustrates track modification information associated with a SFX file such as a WAV or MP3 file. As shown, the track modification information illustrates plural tracks that make up the SFX file, in the example shown, a bass track 402, an AC GTR track 404, an EG track 406, a PAD01 track 408, a Lead Vox Eng track 410, and a Back End track 412. Respective sound images 414 may be presented for each track, representing the particular contribution of that track to the overall SFX file.

Also, the screen shot illustrates that for each track, parameters 416 of the track can be presented. The parameters include, without limitation, volume, delay, attenuation, compression, distortion, and reverberation, panning, filter, time stretch, pitch shift. Collectively, all of the above information can be regarded as the track modification information that accompanies the SFX multitrack file, and an application developer such as a game developer can modify any such information. Thus, the game developer can modify the parameters of individual tracks and, hence, modify the sound contribution to the SFX of individual tracks, and can remove individual tracks as desired, and make other modifications to the SFX file established by the tracks.

Figure 5:
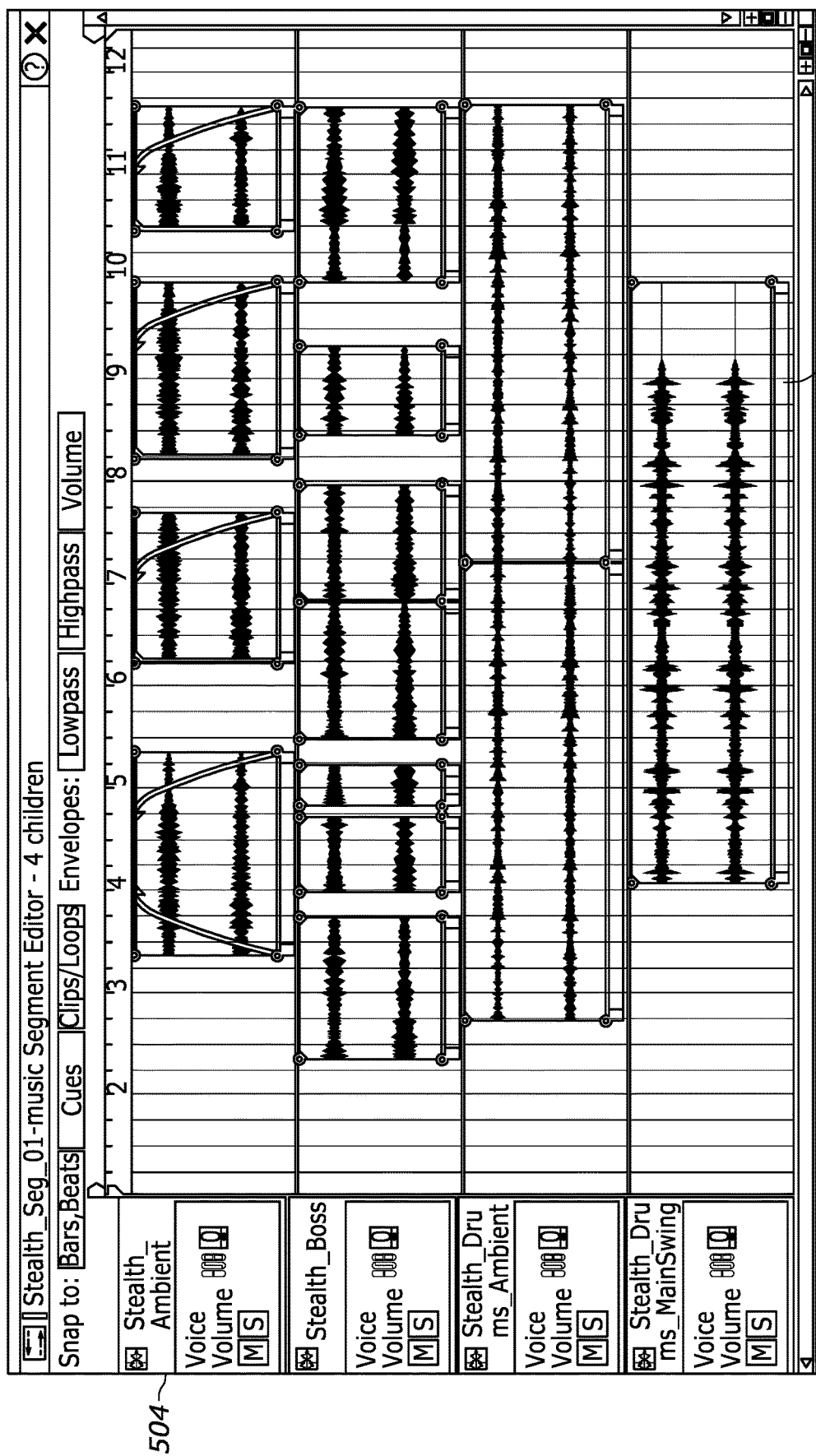
Figure 6:
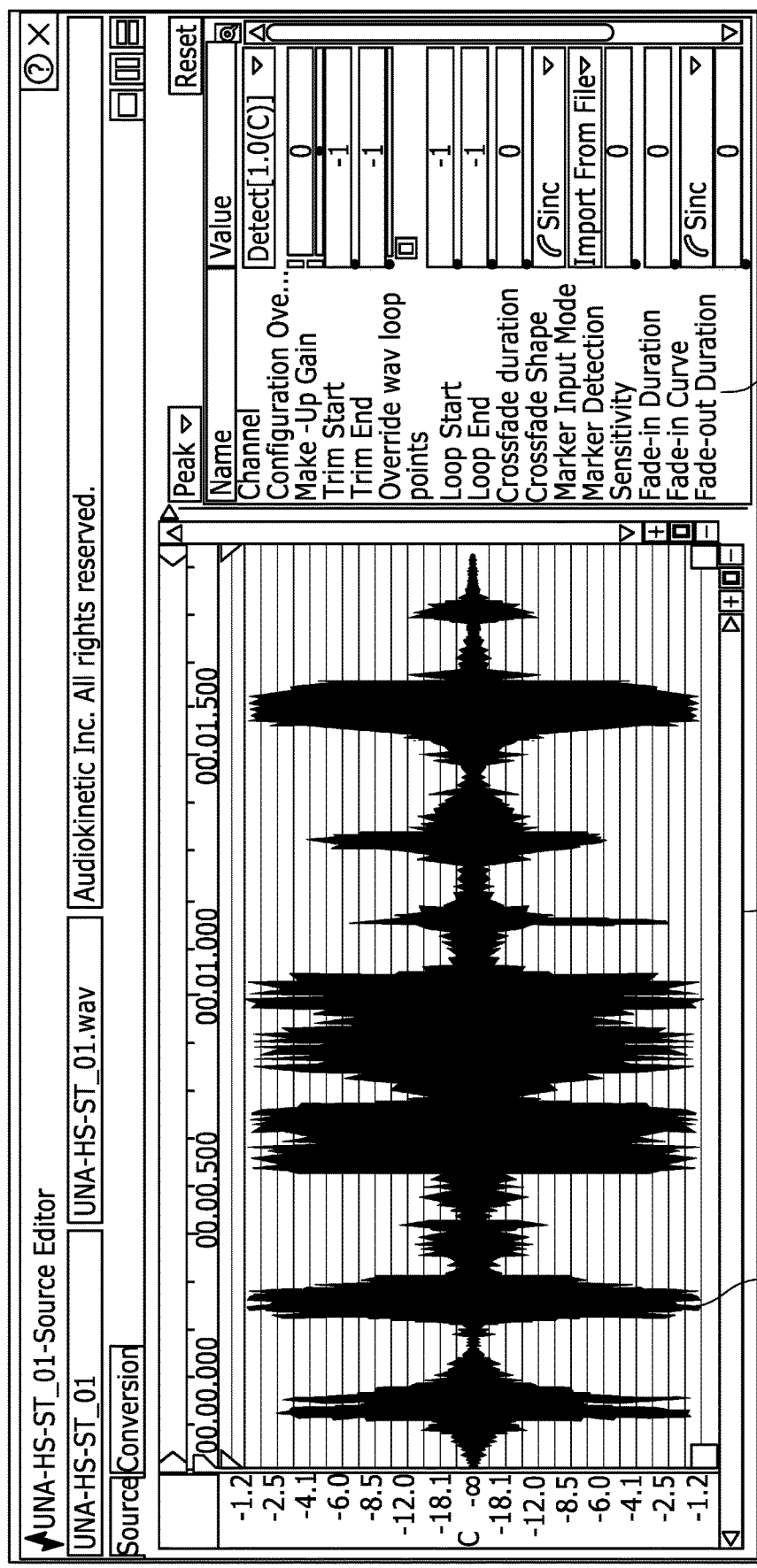

This is illustrated further in FIG. 5, which shows a screen shot 500 that may be presented on, e.g., the customer application developer computer 204 shown in FIG. 2 or other display disclosed herein, in the example shown, using Wwise. For simplicity FIG. 5 illustrates four tracks 502 for editing. Editing selectors 504 are provided for each respective track to enable modification of individual tracks or elimination of certain tracks from the final SFX file, an example audio diagram of which is shown in the screen shot 600 of FIG. 6 as indicated at 602. FIG. 6 also indicates that SFX output parameters 604 may be presented, including, without limitation, channel configuration, make up gain, trim start, trim end, override WAV loop points and loop start and end times, crossfade duration and crossfade shape, marker input mode, marker detection sensitivity, fade-in duration, fade-in curve, and fade-out duration. Note that is non-limiting examples these output parameters 604 may also be part of the track modification information for each track in the multitrack container 202.

Using any of the information discussed herein, a game developer can modify a multitrack SFX to change the delay between tracks, the amplitude of any given track, the attenuation of any give track, and filtering for any track, such as by adding or removing high frequency components or low frequency components of the track. One track may be faded in or out or removed altogether. Compression, reverberation, panning, filter, time stretch, pitch shift, and distortion may be added to one or more tracks. Surround sound may be accommodated by designating some tracks for play on front speakers, other tracks for play on rear speakers, etc.

Figure 7:
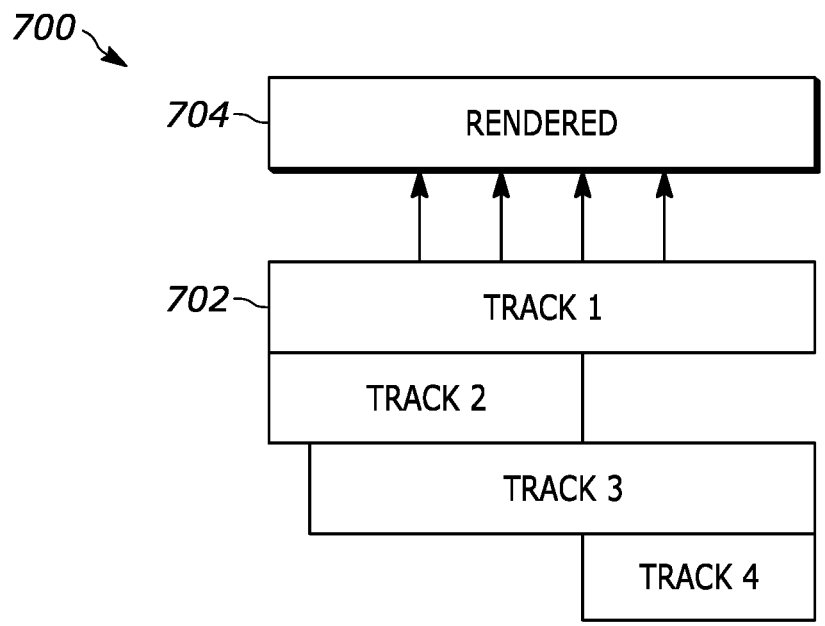
FIG. 7 illustrates rendering four tracks of an example SFX into a single track.

FIG. 7 illustrates a simplified SFX 700 with four tracks 702 that are rendered into a single SFX sound 704. As an example, suppose the SFX 700 is for a footfall (shoe step). One track 702 may be for a shoe-pavement scraping sound, another track may be for a heel sound striking pavement, another track may be the toe striking the pavement, and another track may be for the swoosh of clothing as the character walks.

Figure 8:
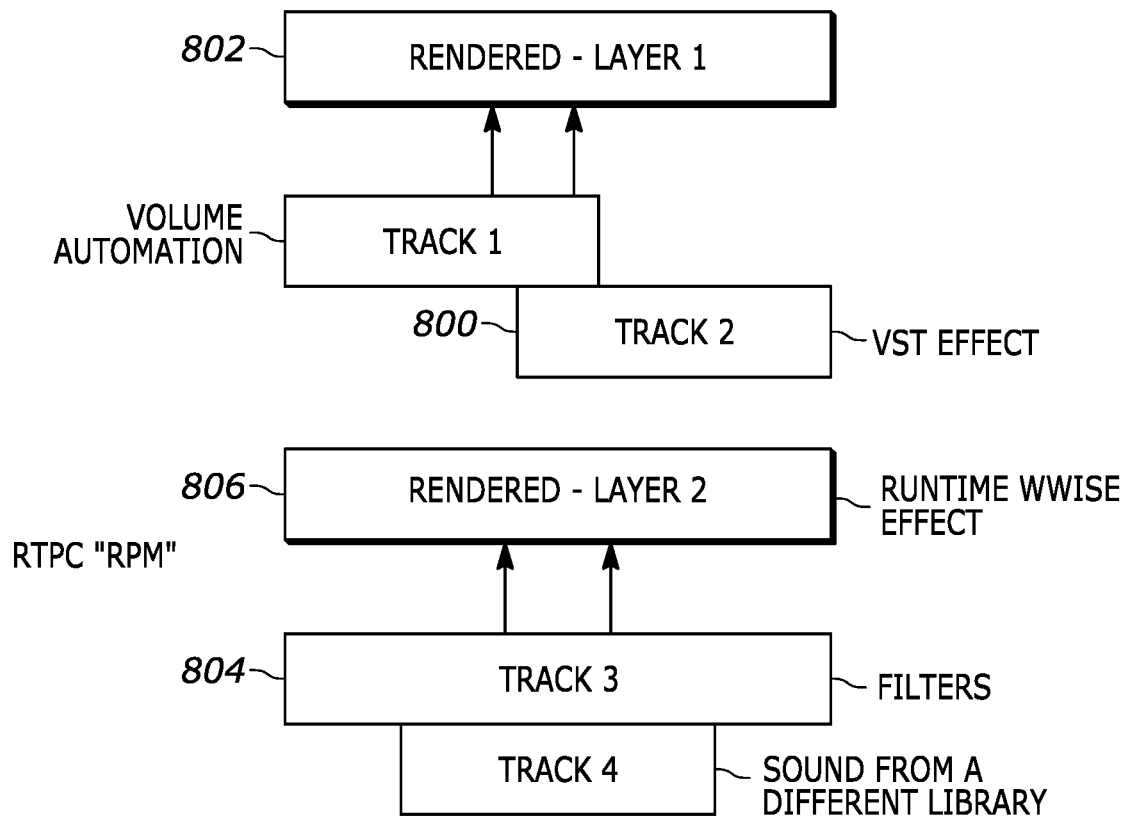
FIG. 8 illustrates rendering four tracks of an example SFX into multiple tracks.

FIG. 8 illustrates that some tracks 800 can be combined to render a first layer 802 of a sound effect while other tracks 804 can be combined to render a second layer 806 of the SFX. Rendering may be done offline in which game designers can modify/mix the content to their liking prior to rendering to a single audio file that will then be imported into the sound engine (e.g. Wwise).

Or, as illustrated in FIG. 8 rendering may be done at game playback runtime according to game calls. In essence, sound designers have the ability to import the multitrack session into the rendering engine (such as Wwise) and then regroup some tracks together on which they attach Realtime parameter control (RTPC) and states that the game engine triggers at runtime. RTPC and States are sound designer-friendly abstractions of game engine application programming interface (API) calls.

Figure 9:
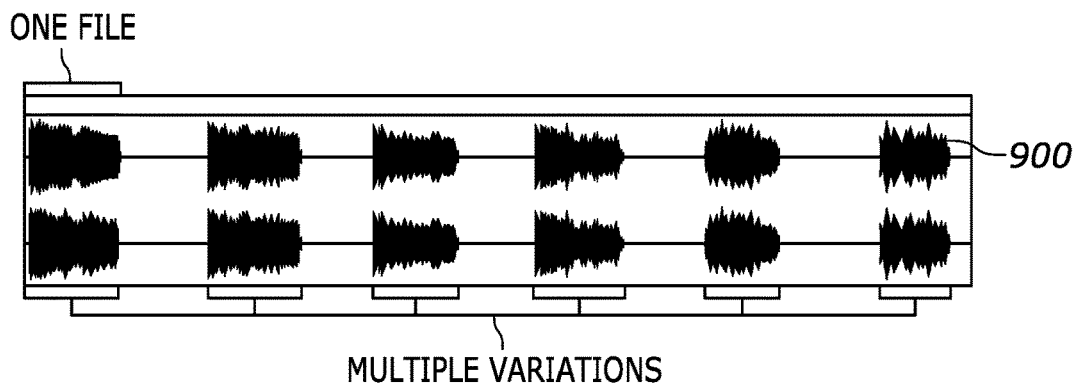
FIG. 9 illustrates multiple variations of the same SFX as may be produced by multiple game designers.

FIG. 9 illustrates visual representations of SFX all derived from a common multitrack container to indicate that many different modifications may be made to the same SFX by different game designers.

Figure 10:
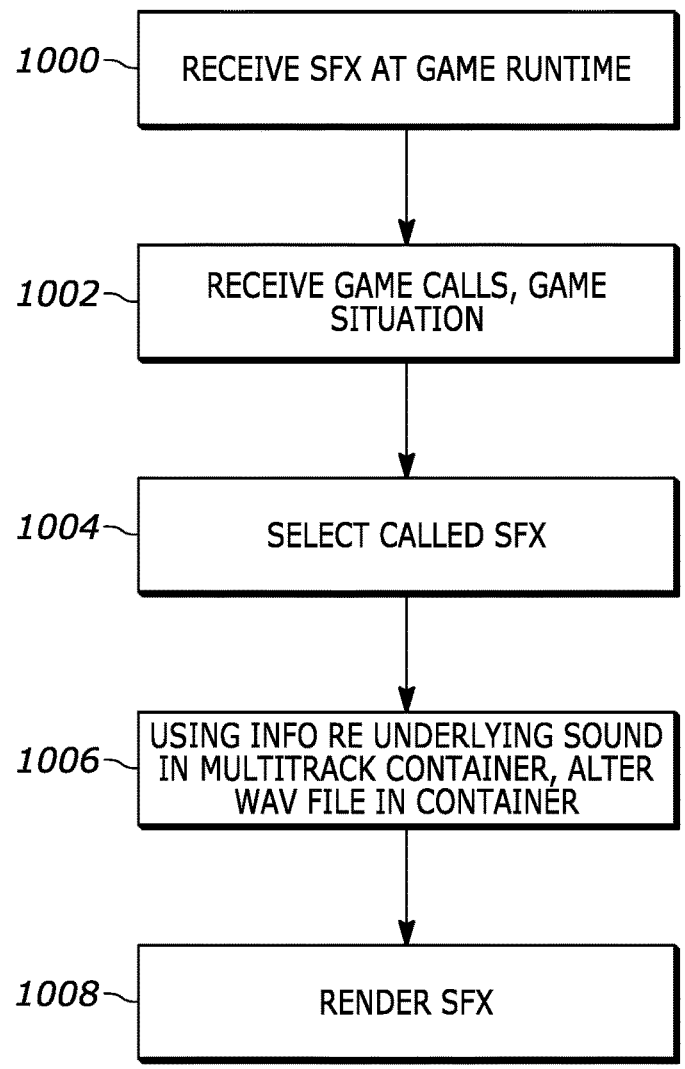
FIG. 10 illustrates example run time rendering logic consistent with present principles in example flow chart format.

FIG. 10 illustrates runtime logic discussed above. Commencing at block 1000, a multitrack container may be received at runtime. Game calls driven by the game situation re received at block 1002. Moving to block 1004, the called SFX is accessed. Proceeding to block 1006, using the track modification information, the SFX file in the container is modified and the modified SFX is rendered at block 1008.

It will be appreciated that whilst present principals have been described with reference to some example embodiments, these are not intended to be limiting, and that various alternative arrangements may be used to implement the subject matter claimed herein.

What is claimed is:

1. A method, comprising: establishing a multitrack container comprising a first sound effect (SFX) file and first and second information, for at least respective first and second tracks in the first SFX file, respective first and second track modification information useful for modifying the respective track, the first SFX file representing at least one sound effect; providing over a computer network the multitrack container to at least a first developer of a first computer game to allow the first developer to modify the first SFX file using the first track modification information in a first way for rendering in the first computer game, wherein the first SFX file comprises at least four tracks representing a footfall, the first track representing a shoe-pavement scraping sound, the second track representing a heel sound striking pavement, a third track representing a toe striking the pavement, and a fourth track representing swoosh of clothing; combining at least some of the first through fourth tracks to generate a first layer of the sound effect; combining at least some of the first through fourth tracks to generate a second layer of the sound effect; and playing the sound effect on at least one speaker.

2. The method of claim 1, comprising providing the multitrack container to at least a second developer of a second computer game to allow the second developer to modify the first SFX file in a second way using the first track modification information for rendering in a second computer game.

3. The method of claim 1, comprising transmitting to the first developer a SFX rendering engine.

4. The method of claim 3, wherein the SFX rendering engine comprises a SFX authoring tool.

5. The method of claim 1, wherein the track modification information comprises, for at least first and second tracks of the SFX file, respective first and second track modification information such that the first developer can modify the first track separately from the second track.

6. The method of claim 5, wherein the first track modification information comprises at least one of: delay, attenuation, compression, distortion, reverberation, panning, time stretch, pitch shift.

7. The method of claim 1, wherein the first track modification information comprises at least one of:
channel configuration, make up, trim start, trim end, override WAV loop points, loop start and end times, crossfade shape, marker input mode, marker detection sensitivity, fade-in curve.

* * * * *